Figure 1:
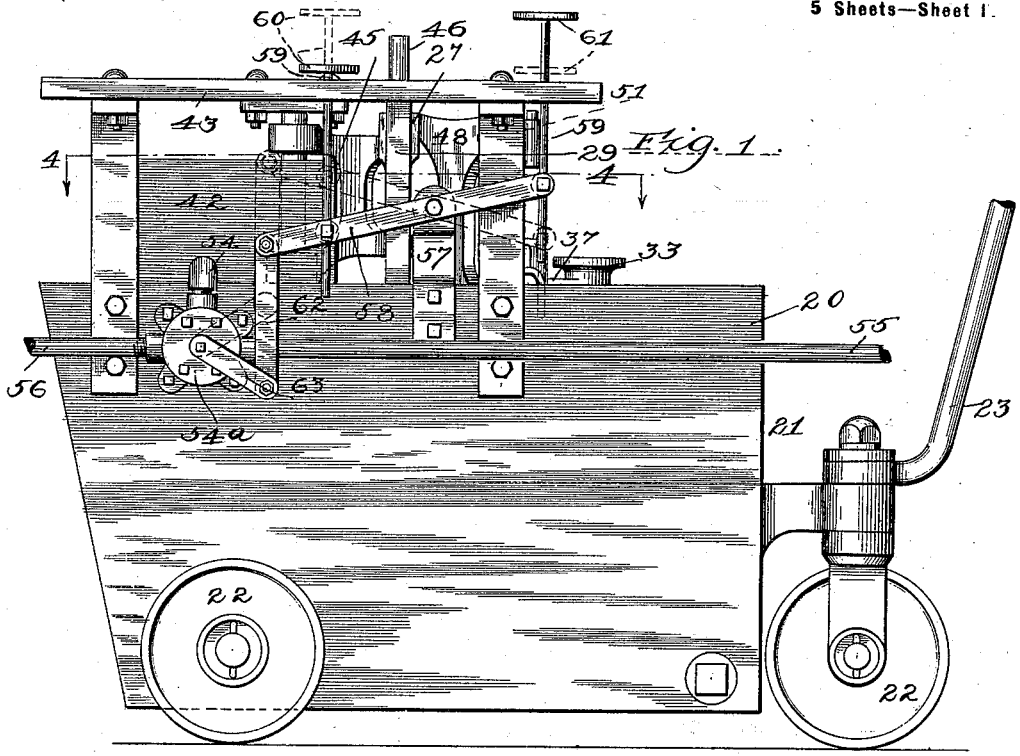

No. 628,543.  
J. E. LIPPINCOTT.  
DEVICE FOR COOLING MOLDS.  
(Application filed Jan. 16, 1899.)  
(No Model.)

Patented July 11, 1899.

5 Sheets—Sheet 1.

Witnesses:  
Harry R. White  
R. White

Inventor:  
J. Evans Lippincott  
By Dwight B. Cheever  
Atty.

No. 628,543. Patented July 11, 1899.
J. E. LIPPINCOTT.
DEVICE FOR COOLING MOLDS.
(Application filed Jan. 16, 1899.)
(No Model.) 5 Sheets—Sheet 2.

Witnesses
Inventor:
J. Evans Lippincott
By Dwight B Cheever
Atty.

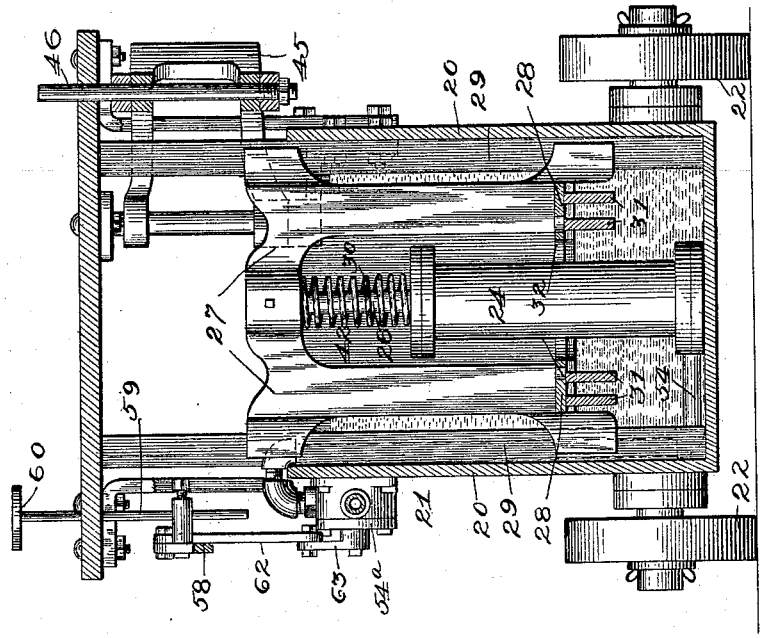

No. 628,543. Patented July 11, 1899.
J. E. LIPPINCOTT.
DEVICE FOR COOLING MOLDS.
(Application filed Jan. 16, 1899.)
(No Model.) 5 Sheets—Sheet 4.
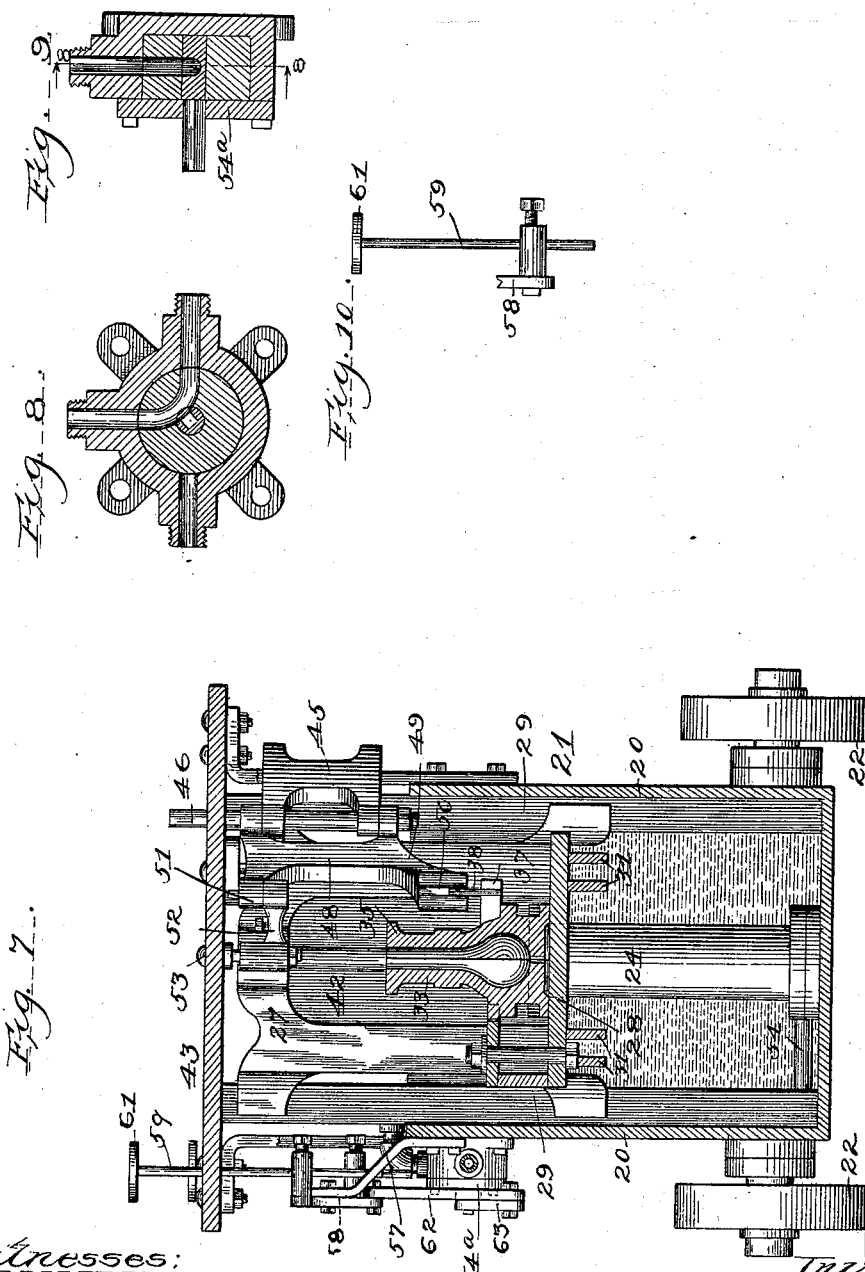

No. 628,543. Patented July 11, 1899.
J. E. LIPPINCOTT.
DEVICE FOR COOLING MOLDS.
(Application filed Jan. 16, 1899.)

(No Model.) 5 Sheets—Sheet 5.

Witnesses:

Inventor:
J. Evans Lippincott
By Dwight B. Cheever Atty.

UNITED STATES PATENT OFFICE.

JASON EVANS LIPPINCOTT, OF ALEXANDRIA, INDIANA, ASSIGNOR TO THE LIPPINCOTT GLASS COMPANY, OF SAME PLACE AND CINCINNATI, OHIO.

DEVICE FOR COOLING MOLDS.

SPECIFICATION forming part of Letters Patent No. 628,543, dated July 11, 1899.

Application filed January 16, 1899. Serial No. 702,343. (No model.)

*To all whom it may concern:*

Be it known that I, JASON EVANS LIPPINCOTT, a citizen of the United States, and a resident of Alexandria, in the county of Madison and State of Indiana, have invented a certain new and useful Device for Cooling Molds, of which the following is a specification in its best form now known to me.

My invention relates to devices for cooling molds, and particularly to such devices in machines for blowing lamp-chimneys and other glassware.

The object of my invention is to provide a machine of this class in which the mold can readily be immersed in and removed from water or other liquid, thus cooling the mold and preventing burning of the interior lining of the mold.

It also relates to details of construction hereinafter described and claimed.

In the drawings similar figures relate to similar parts throughout the several views.

Figure 2:
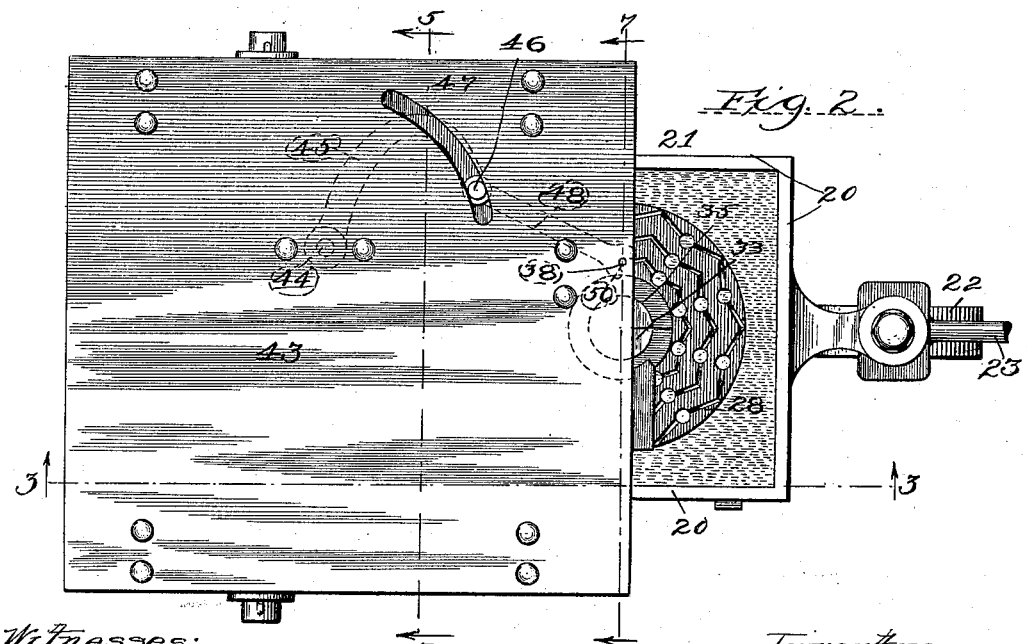
Figure 3:
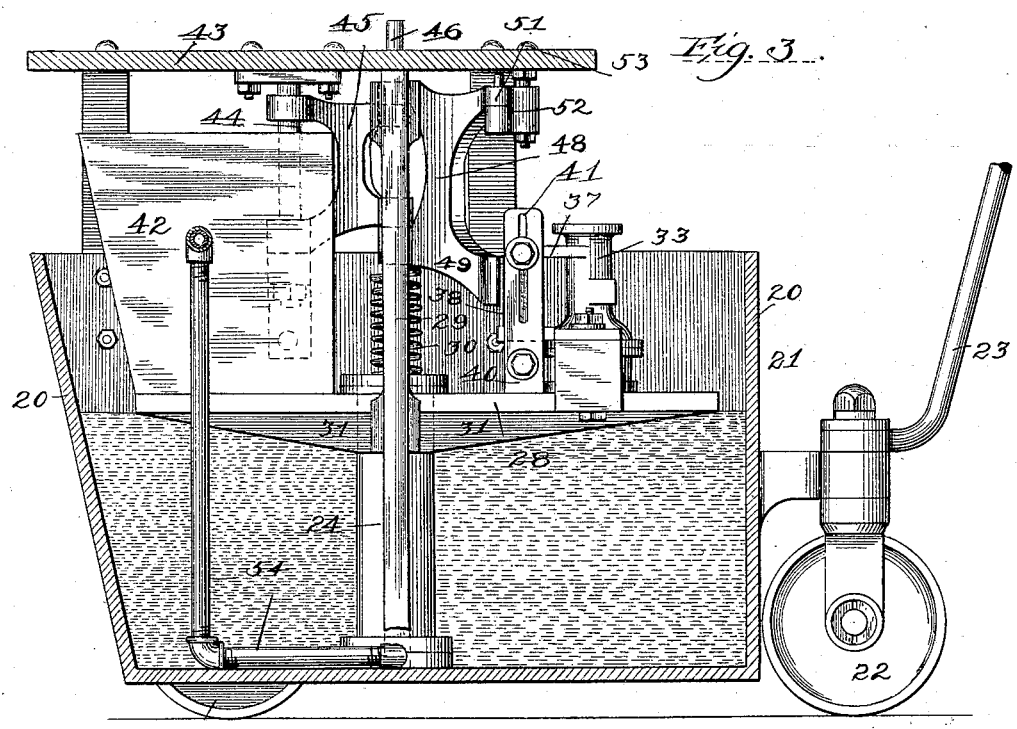
Figure 4:
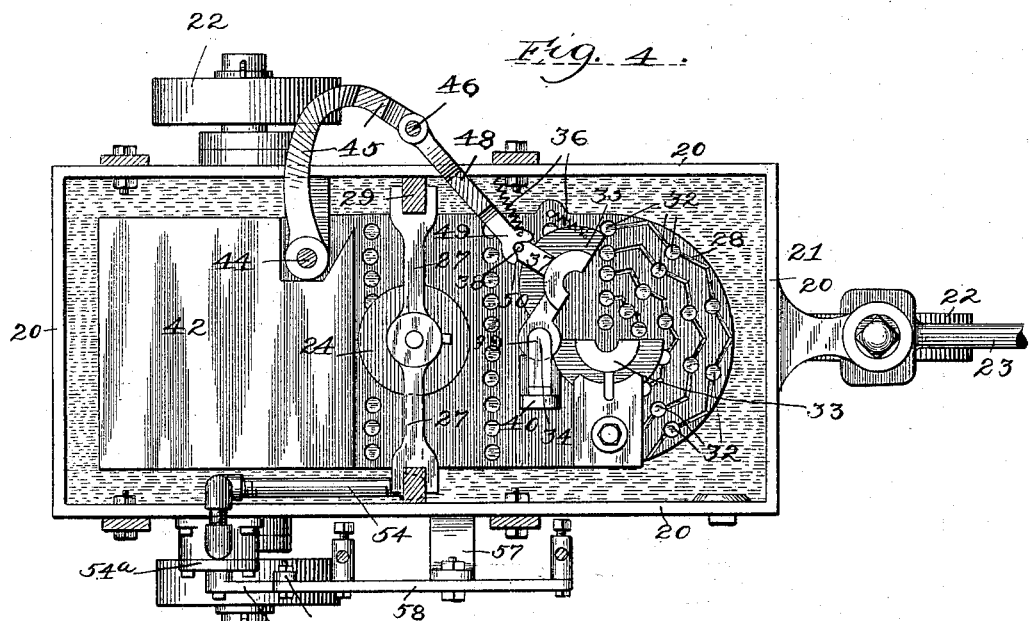
Figure 11:
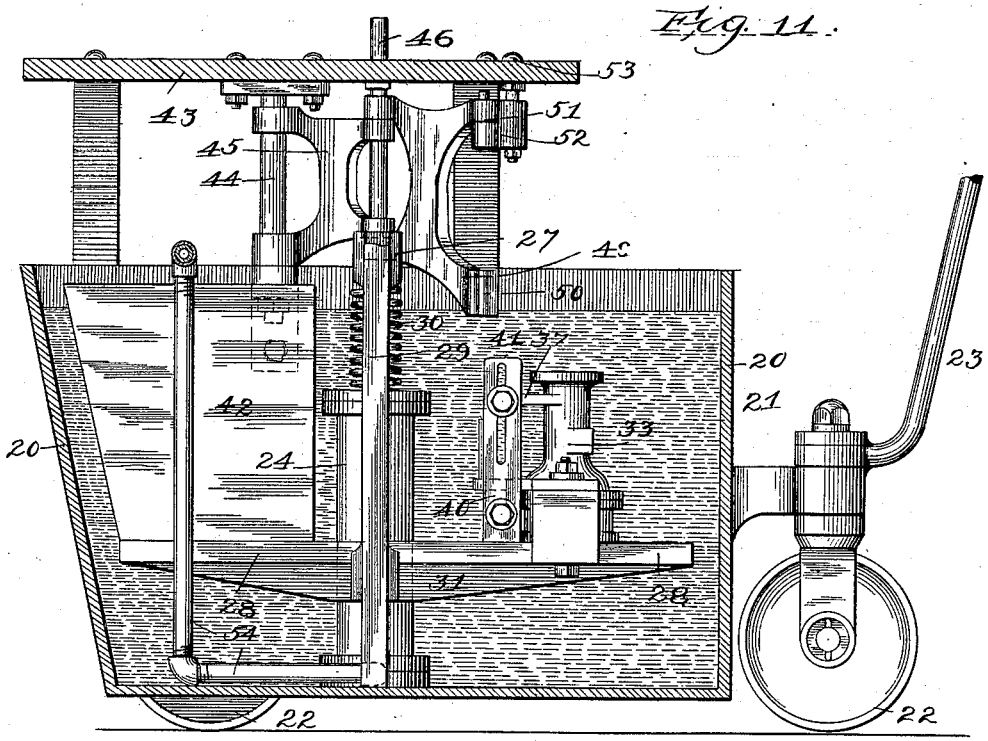
Figure 12:
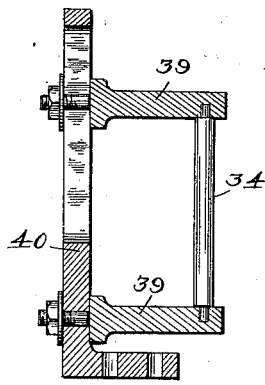
Figure 13:
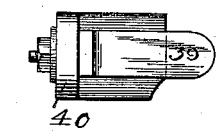
Figure 14:
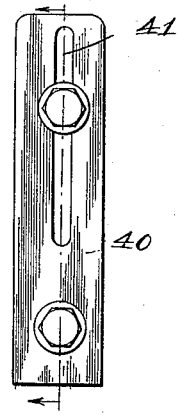
Figures 15, 16:
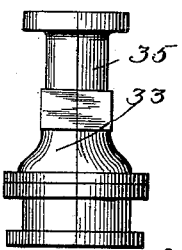

Figure 1 is a side and Fig. 2 a top view of my improved machine; Fig. 3, a sectional side view on line 3 of Fig. 2. Fig. 4 is a plan view from line 4 of Fig. 1. Fig. 5 is a side view taken on line 5 of Fig. 2, showing the cylinder partly in section and the mechanism raised, while Fig. 6 shows the same view, cylinder not in section, with mechanism lowered. Fig. 7 shows a side sectional view through the center of the mold. Fig. 8 is a side and Fig. 9 a central sectional view through the center of the three-way valve. Fig. 10 is a detailed view of the rod and pedal for operating the valve. Fig. 11 is the same view as Fig. 3, showing the mechanism lowered into the liquid. Fig. 12 is a section, Fig. 13 a plan, and Fig. 14 a side view, of support for the mold-hinge. Fig. 15 is a top and Fig. 16 a side detail view of the mold.

In the drawings, 21 is a tank for water or other cooling liquid, of any convenient shape, mounted for convenience upon wheels 22, so that it may be drawn by handle 23 to any location desired. Rigidly secured to the bottom of the tank, at about its center, is cylinder 24, with its piston 25 and piston-rod 26 extending upward. To the upper end of piston-rod 26 is rigidly secured the framework or cross-head 27, bearing at its lower end the table or platform 28 and adapted to slide up and down upon the guides 29, rigidly secured to the sides 20 of tank 21. Surrounding piston-rod 26 and interposed between the top of cylinder 24 and frame 27 is a spring 30, adapted gradually to check the fall of the cross-head (and platform 28) upon the top of the piston. The platform 28 is strengthened by the truss-braces 31 on its under side and has holes 32 through it to allow for the free passage of liquid. This platform might be supported by more than one cylinder without departing from my invention, and by making the tank deeper the mold might be mounted directly on the piston-rod without departing from the invention; but the construction shown has the advantage of enabling a more shallow and convenient tank to be used.

Rigidly secured to the platform 28 is a mold consisting of a fixed portion 33, having hinged to it at 34 another movable part 35, held normally opened by springs 36. The mold-sections are lined with the paste lining ordinarily used in such glass-blowing molds. Extending from the fixed portion 35 is an arm 37, having the pin 38 rising from it. The hinge 34 of the mold is supported in the arms 39, attached to the upright 40, rising from the platform or table 28. The upper arm 39 may be adjusted up and down in the slot 41 of the upright 40, thus enabling different-sized molds with different-length hinges to be substituted for the mold shown. On the opposite side of the table 28 is an air-tight box 42, which helps to displace the water in the tank as the apparatus is lowered into the water.

Mounted above the tank upon the uprights 29 is a working table 43, upon which the workman stands. Below this table, at 44, is pivoted a lever-arm 45, bearing at its outer end an upright rod 46, which extends up through and is adapted to move in a slot 47, cut in table 43. Pivoted to rod 46 is another lever, having an arm 48 extending upward and another arm 49 extending slightly downward. The lower arm 49 has a notch 50, adapted to engage with pin 38 on arm 37 of mold-section 35, and the upper arm 48 is pivoted at its outer end 51, directly over notch 50, to a radial arm 52, having its center at 53 directly over the center of hinge 34. The radius of arm 52 being the distance from pivot 38 to hinge 34, the notch 50 and pivot 51 will move in a circle about the axis of hinge 34.

Connected to the lower end of cylinder 24 is an air or steam pipe 54, extending to a three-way valve 54ª, mounted on the side of tank 20 and having the supply-pipe 55 and the exhaust-pipe 56. Pivoted to support 57 on the side of the tank is a lever 58, having pivotally connected to it at substantially equal distances each side of the pivot 57 the vertical rods 59, which have at their upper ends the foot-pedals 60 and 61. The lever 58 is pivotally connected by lever-arms 62 and 63 to the valve 54, so that shoving down on pedal 60 will open the valve and admit steam from supply-pipe 55 to the cylinder and stepping on pedal 61 will turn the valve so as to allow the steam to be exhausted from the cylinder through discharge-pipe 56.

In operating the machine the workman stands upon table 43 and presses pedal 60 downward, as shown in Fig. 1. This admits steam, compressed-air, or water pressure (whichever the manufacturer prefers) into the cylinder below the piston and puts the apparatus in the position shown in Figs. 1, 3, and 5. He now takes an ordinary blowpipe, places the end of it, with a lump of molten glass on it, in the mold, and by pressing his foot against pin 46 (moving levers 45 and 48 to the position shown in dotted lines in Fig. 2) closes the mold. He now blows through the pipe and manipulates the glass in the usual manner until the article is properly formed and then withdraws his foot from rod 46, when, under the action of springs 36, mold-section 35 swings open to its first position and he removes the glass. The tank having been filled with water or other cooling liquid, as shown in Fig. 3, the workman now steps on pedal 61, thus throwing lever 56 to the position shown in dotted lines in Fig. 1, which permits the steam or air to exhaust from the cylinder through pipe 56. As this is done the table 28, bearing with it the molds and the box 42, settles into the water, as shown in Figs. 6 and 11, the pin 38 slipping out of notch 50. The mold being sufficiently cooled by the water, the workman steps on pedal 60 and moves the lever 58 and the valve 54ª back to the original position, as shown in heavy lines, Fig. 1, thus admitting steam or air into the cylinder below the piston and forcing the table with the molds upward to their original position. The operation may then be repeated. By connecting pipe 54 to the upper end of the cylinder instead of to the lower and attaching an air-pump the apparatus may be raised by pumping the air out of the cylinder and lowered by gravity.

Having thus described my invention, what I claim as new, and desire to secure by Letters Patent, is—

1. In a glass-blowing machine, the combination of a tank to contain cooling liquid, a vertical cylinder with its piston and piston-rod mounted therein, a glass-blowing mold connected to the piston-rod of said cylinder, and means for supplying pressure to the piston in said cylinder whereby said mold is moved into and out of said cooling liquid.

2. In a glass-blowing machine, the combination of a tank to contain cooling liquid, a vertical cylinder with its piston and piston-rod mounted therein, a mold having a fixed part rigidly secured to the piston-rod of said cylinder, a movable (mold) part hinged thereto, means for opening and closing said mold, and means for supplying pressure to the piston in said cylinder whereby said mold is moved into and out of said cooling liquid.

3. In a glass-blowing machine, the combination of a tank to contain cooling liquid, a vertical cylinder with its piston and piston-rod mounted therein, a table surrounding said cylinder and suspended from its piston-rod, a glass-mold mounted on said table, and means for applying pressure to the piston in said cylinder whereby said table and mold are moved into and out of said cooling liquid.

4. In a machine of the class described, the combination of a tank to contain cooling liquid, a vertical cylinder with its piston and piston-rod mounted therein, guides on the side of said tank parallel to the axis of the cylinder, a cross-head attached to the piston-rod of said cylinder, adapted to slide up and down on said guides, a platform or table around said cylinder, and slidable thereon, secured to the lower end of said cross-head, a mold mounted upon said table, means for opening and closing said mold, and means for supplying pressure to the piston in said cylinder whereby said mold, table and cross-head are moved into and out of said liquid.

5. In a glass-blowing machine, the combination of a tank to contain cooling liquid, a vertical cylinder with its piston and piston-rod mounted therein, a glass-blowing mold supported on the upper end of the piston-rod of said cylinder, a working table mounted above said tank, and means under the control of the operator upon said working table for admitting pressure to the piston in said cylinder whereby said mold is moved into and out of said cooling liquid at the will of said operator.

6. In a glass-blowing machine, the combination of a tank to contain cooling liquid, a vertical cylinder with its piston and piston-rod mounted therein, a glass-blowing mold connected to the piston-rod of said cylinder, a working table mounted above said tank, and means under the control of the operator upon said table for opening and closing said mold.

7. In a glass-blowing machine, the combination of a tank to contain cooling liquid, a vertical cylinder with its piston and piston-rod mounted therein, a glass-blowing mold connected to the piston-rod of said cylinder, a working table mounted above said tank, means under the control of the operator upon said table for opening and closing said mold when out of the cooling liquid and means under the control of said operator for admitting pressure to the piston in said cylinder whereby said mold is moved into and out of said cooling liquid as desired.

8. In a glass-blowing machine, the combination of a tank to contain cooling liquid, a cylinder with its piston and piston-rod mounted therein, a mold consisting of a fixed and a hinged part connected to said piston-rod, a system of levers pivoted at one side adapted to open and close said mold, and means for supplying pressure to the piston in said cylinder whereby said mold is moved into and out of said cooling liquid.

9. In a glass-blowing machine, the combination of a vertical cylinder with its piston and piston-rod, the mold connected to the piston-rod, the working table, the levers 45 and 48, the pin 46 extending through the slot in the table, and the radial arm 52 pivoted to said table and to said lever 48, substantially as shown and described.

10. In a glass-blowing machine, the combination of a working table, the pivoted lever 58 having pivoted thereto the rods 59, extending up through the table, bearing at their upper ends the pedals 60 and 61, means for connecting said lever 58 to mechanism controlling the supply of power to the machine whereby as said pedals are raised and depressed power is admitted to or cut off from said machine.

11. In a glass-blowing machine, the combination of a tank to contain cooling liquid, a vertical cylinder with its piston and piston-rod mounted therein, a glass-blowing mold connected to said piston-rod, a working table mounted above said tank, and means under the control of the operator upon said table for controlling the pressure on said piston in said cylinder whereby said mold is moved into and out of said cooling liquid.

12. In a glass-blowing machine, the combination of a tank to contain cooling liquid, a cylinder with its piston and piston-rod, and a glass-blowing mold so connected to said piston-rod that as the piston is moved in said cylinder the mold is moved into and out of the cooling liquid in said tank.

13. In a glass-blowing machine, the combination of a tank to contain cooling liquid, a vertical cylinder with its piston and piston-rod, a glass-blowing mold connected to the piston-rod of said cylinder, and means for supplying pressure to the piston in said cylinder whereby said mold is moved into and out of said cooling liquid.

14. In a glass-blowing machine, the combination of a tank to contain cooling liquid, a vertical cylinder with its piston and piston-rod, and a glass-blowing mold so connected to said piston-rod that as the piston is moved up and down the mold is moved into and out of cooling liquid in said tank.

J. EVANS LIPPINCOTT.

Witnesses:
SOPHIA HALDER,
STEPHEN L. O'BRYANT.